United States Patent [19]

Hyde

[11] 3,927,556

[45] Dec. 23, 1975

[54] EXPANDABLE PIPELINE PLUG LEAK LOCATION METHOD

[75] Inventor: Walter E. Hyde, Duncan, Okla.

[73] Assignee: Halliburton Company, Duncan, Okla.

[22] Filed: Nov. 15, 1973

[21] Appl. No.: 415,947

Related U.S. Application Data

[62] Division of Ser. No. 240,071, March 31, 1972.

[52] U.S. Cl. ............................... 73/40.5 R; 138/90
[51] Int. Cl.² ..................... G01M 3/28; F16L 55/12
[58] Field of Search .............. 73/40.5, 49.8; 138/90, 138/97

[56] References Cited
UNITED STATES PATENTS

| | | | |
|---|---|---|---|
| 3,561,490 | 2/1971 | Little | 138/97 |
| 3,690,348 | 9/1972 | Patterson | 138/97 |
| 3,693,408 | 9/1972 | Hyde | 73/49.8 |
| 3,768,304 | 10/1973 | Hyde | 73/40.5 |
| 3,837,214 | 9/1974 | Guest | 73/40.5 R |

Primary Examiner—Richard C. Queisser
Assistant Examiner—John S. Appleman
Attorney, Agent, or Firm—John H. Tregoning

[57] ABSTRACT

A pipeline leak location method utilizing an expandable pipeline plug wherein incremental plug movements of substantially equal length are made. Following the incremental movements segmental movements of a substantially equal lesser length are made in the opposite direction to the incremental movement direction. The pipeline is pressurized after each movement and pressure measured to locate any leaks in the pipeline.

16 Claims, 4 Drawing Figures

3,927,556

1

EXPANDABLE PIPELINE PLUG LEAK LOCATION METHOD

This is a division of application Ser. No. 240,071, filed Mar. 31, 1972.

BACKGROUND OF THE INVENTION

The use of pipelines as a means for transporting liquid and gaseous products is becoming more and more widespread each day. Pipelines are the prime means of transporting pertroleum products and raw materials. Most of the natural gas used in this country is transported by pipeline. Other products moving by this means of transportation include crude oil, gasoline, jet fuel, water, steam, cement, plastics, acids, and just about any form of fluid that has to be moved from one location to another, even including such unlikely fluids as milk or beer.

Of course all of these fluids must be pumped under high pressures to obtain sufficient movement between shipping and receiving points. This necessitiates that in order to prevent loss of fluids and possible contamination of the material, the pipeline must remain intact and fluid tight at all times. Thus, leaks which occur naturally and fairly frequently must be quickly located and repaired.

This is even more imperative when the products being piped are highly flammable and explosive, such as petroleum products, because pipelines carrying such products are frequently located where a fire or explosion could cause loss of life and large property damage.

As a precautionary measure, pipelines which are to carry explosive products as well as pipelines handling other contaminable fluids, are tested for leaks after they have been installed but prior to their first use. They are afterwards checked periodically and also checked when a known leak has occurred or a leak is suspected.

In the case of large high pressure pipelines the testing operation can prove to be quite costly, often running as high as 50 to 100,000 dollars for lengthy lines. This is the cost of testing alone.

A common procedure for testing an underground pipeline is to find two widely separated points on the pipeline exposed to the surface where valves are or may be located in the line. If valves are not available the pipeline must be excavated at each point and a valve installed in the line by cutting and welding. Then at a point approximately half-way between the two valves, the line is excavated and a plug or blind flange is inserted into the line, once again by cutting and welding. A fluid such as distilled water is then pumped into the two isolated halves of the pipelines and pressured up and then the pressure is monitored in each section over a period of time to determine if either or both sections have a leak. The process is repeated by halving each section and then halving each half until the location of the leak is narrowed down sufficiently to locate the leak. This proves to be a costly time consuming process as each relocation of the blind flange involves uncovering the line, cutting into it, placing a blind in it and then rewelding. After testing, all blinds must be removed which is as troublesome as their installation.

An alternative to installing the welded blinds, which alternative is an improvement over that technique, is the use of freezing a bridge across the pipeline. This removes the necessity of cutting the line and welding in the blind flange, then recutting and rewelding when removing the flange. Freezing a bridge is fairly slow and difficult because of the difficulty in freezing across the complete diameter of some large pipelines. This difficulty is alleviated somewhat by the use of a freeze plug such as that disclosed in pending U.S. application, Ser. No. 150,313 now U.S. Pat. No. 2,695,301 by Forrest Pittman.

Although the freeze plug device disclosed in the above pending application is a substantial improvement over the known methods of plugging a line for testing, it requires that a line be uncovered for each plug or bridge to be installed in the line. It also requires cooling apparatus for application of freezing medium to the pipeline although the feeezing is greatly facilitated compared to the methods known in the prior art.

What the prior art lacks and what has been long needed for testing pipelines is a method of pipeline leak location utilizing a plugging device which can be actuated to isolate sections of a pipeline without having to uncover and cut the pipeline or uncover and apply a freezing medium to the pipeline.

The present invention solves the problems of the prior art by providing a method of pipeline leak location utilizing a plugging device sealing device which can be flowed down a pipeline, actuated by remotely controlled means into sealing engagement with the pipeline, held there indefinitely, and then moved forward or backward to a new position in the line, all of this without having to uncover the line between the two ends.

DESCRIPTION OF THE PREFERRED EMBODIMENTS

Figure 1:
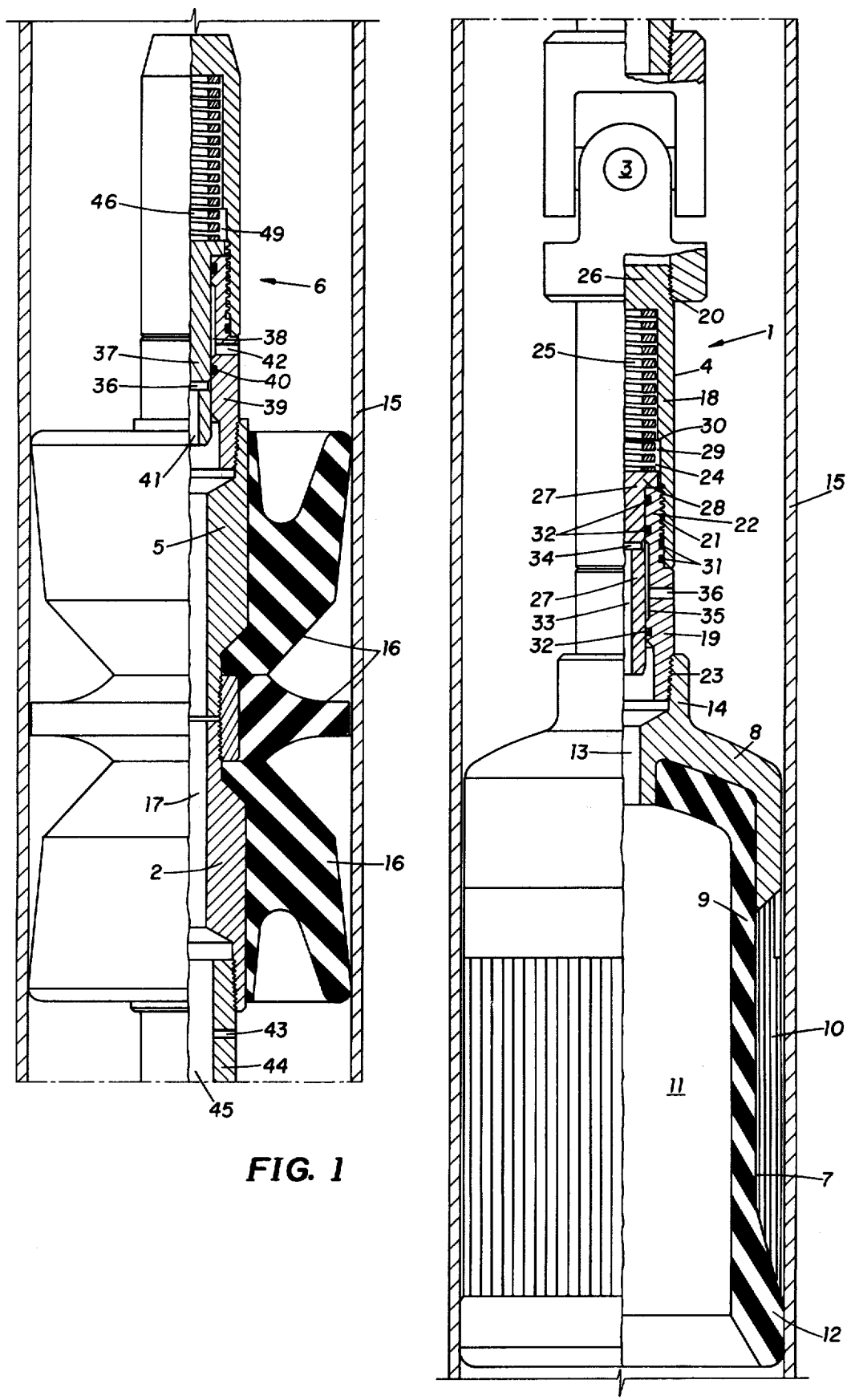
FIG. 1 is a partial cross-sectional view of the seal plug of the present invention as it appears when being flowed down the pipeline.
Figure 2:
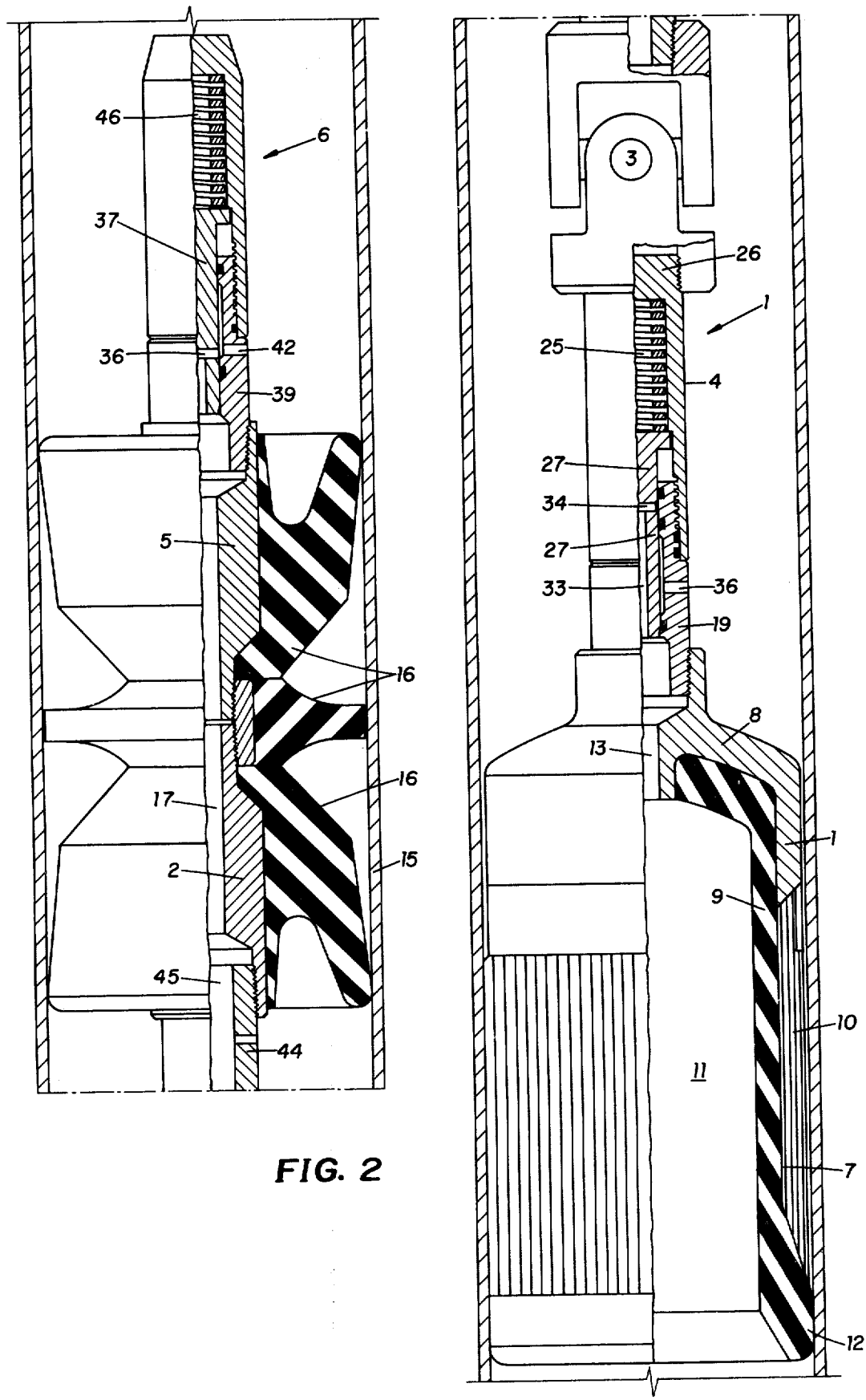
FIG. 2 is a partial cross-sectional view of the seal plug after it has been flowed to position in the pipeline and expanded into sealing engagement with the line.
Figure 3:
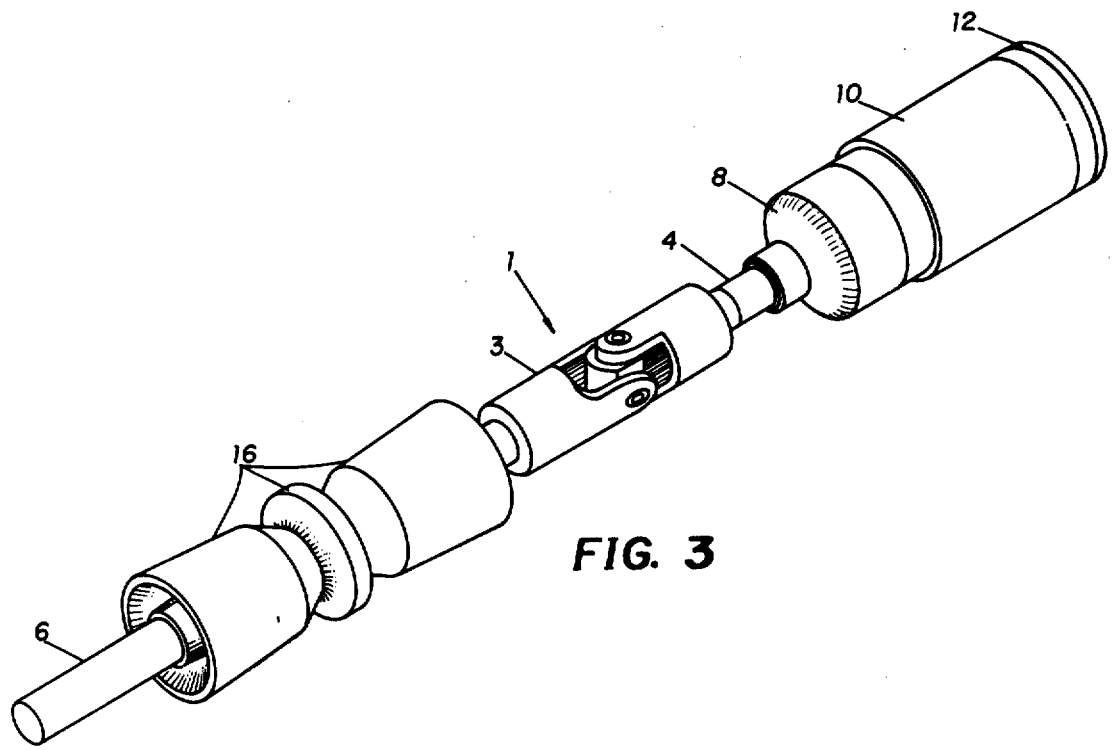
FIG. 3 is an isometric view of the sealing plug outside of the pipeline.

In FIGS. 1 and 2, the leak locator plug 1 is shown having a sealing member 2 connected by a flexible connection 3 to a central valve 4. Attached to the left or downstream end 5 of sealing member 2 is the front valve 6. Connected to the right or upstream end of central valve 4 is expandable seal means 7 consisting of rigid cylindrical head 8, elastomeric casing 9, and rigid ribs 10. Casing 9 is partially encased by and firmly attached to rigid head 8. Ribs 10 are also attached to head 8 and may be partially embedded in casing 9. Casing 9 has an open bore portion 11 and terminates in sealing cup 12. Head 8 has bore passage 13 therethrough and threaded collar 14 for attaching to central valve 4.

Although FIGS. 1 and 2 illustrate the pipeline and the plug in a vertical position, this is for convenience in drawing only and it is emphasized that the normal disposition of the pipeline is generally horizontal and for purposes of description the plug will be described as though in a horizontal position with front valve 6 to the left and expandable seal means 7 to the right.

Expandable seal means 7 is capable of being pulled through a pipeline and then can be sealingly engaged with the interior of the line in fluidically sealed and mechanically anchored relationship by creating a pressure differential across the sealing means. In order to actuate the plug the higher pressure must be on the right side of the seal means 7 as illustrated in FIG. 1 and FIG. 2, and the lower pressure must be to the left. Operation of the expandable sealing means is similar to that of the device disclosed in U.S. Pat. No. 3,353,565, and is achieved when a pressure differential is applied across sealing cup 12. The high pressure exists in bore portion 11, and low pressure exists around ribs 10 between the expandable member and pipeline 15. The fluidic seal is achieved by seal cup 12 and the anchor is set when casing 9 expands outward in response to the high pressure in bore 11, engaging the ribs 10 with the inner surface of pipeline 15. This engagement provides a highly effective frictional anchor preventing axial movement of the locator plug within the pipeline.

The motive force for moving the plug through the pipeline is applied through a pressure differential acting on one or more elastomeric sealing cups 16 fixedly attached to seal member 2. Seal member 2 is substantially cylindrical in shape and has a bore passage 17 providing fluid communication therethrough.

Sealing cups 16 engage the inner surface of pipeline 15 and fluidically seal a cross-section of the pipeline.

Valves 4 and 6 are substantially identical spring-loaded, hydrostatically operated sliding mandrel valves which provide a means of first applying a pressure differential only to the sealing cups 16 for flowing the plug into the pipeline and then applying a pressure differential only to seal means 7 to anchor and seal the plug in the pipeline.

Valve 4 comprises a spring housing 18 attached to a mandrel housing 19. Spring housing 18 is tubular and has means at one end for connecting to swivel connection 3 and means at the opposite end for connecting to mandrel housing 19. In this embodiment the connecting means consist of threaded ends 20 and 21. Mandrel housing 19 contains threaded end 22 which matches the threaded end 21 of housing 18. At the opposite end, housing 19 has threaded end 23 for connecting the housing 19 to threaded collar 14.

Housing 18 is provided with an open central bore portion 24 which is at a predetermined pressure such as atmospheric pressure, and within the chamber formed by bore portion 24 is a preloaded coil spring 25 which abuts at one end on cap plate 26 of housing 18 and at the other end abuts piston mandrel 27 which is telescopically arranged within housing 19. Mandrel 27 has annular shoulder 28 projecting radially outward into annular recess 29 formed in housing 18. Annular shoulder 28 limits longitudinal travel of mandrel 27 within housings 18 and 19 by abutting, in the extended position, end 22 of housing 19 and abutting in contracted position, shoulder 30 of recess 29. Annular seals 32 located in recesses in housing 19 provide fluid seal between mandrel 27 and mandrel housing 19.

Mandrel 27 has a bore passage 33 passing partially through the maandrel along its central axis. Bore passage 33 fluidically commuciates with one or more ports 34 in mandrel 27 which in turn communicate with inner annular recess 35 and one or more ports 36 in mandrel housing 19. Thus, when valve 4 is open as in FIG. 1 no pressure differential exists across seal means 7, and therefore casing 9 remains relaxed and the plug can be flowed easily down the pipeline.

In a low pressure fluid environment, coil spring 25 is strong enough to bias valve 4 into a continuous open relationship to prevent a pressure differential from arising across plug 8. Annular seals 31 and mandrel seals 32 prevent pressurized fluid from entering gas pressure chamber 24 through the threaded connection between housings 18 and 19.

Front valve 6 is substantially identical in structure to center valve 4 except that when coil spring 46 in valve 6 is fully extended in a low pressure environment, valve 6 is in a continuously closed position. This is achieved by having one or more ports 36 in mandrel 37 located to the right of recess 38 and seal 40 in housing 39. Bore passage 41 communicates fluid from bore 17 to ports 36. One or more ports 42 in housing 39 communicate recess 38 to the interior of pipeline 15.

One or more ports 43 through the wall of seal member extension 44 attached to seal member 2, allows fluid from valve 4 to communicate continuously with bore passage 45 and thus with bore passage 17.

Swivel connection 3 may be any readily available connection which allows 360° flexibility. The flexible connection shown consists of a common universal joint.

Figure 4:
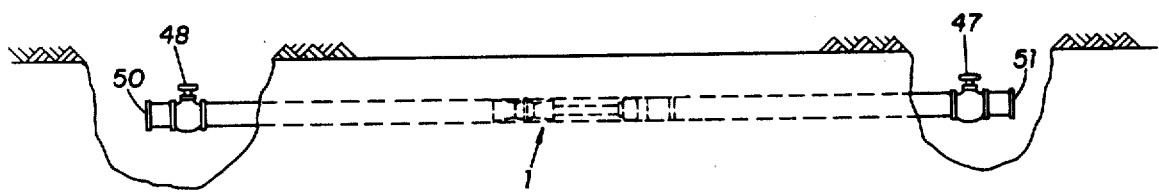
FIG. 4 is a schematic view showing the sealing plug and the section of pipeline to be tested.

In typical operation the pipeline plug 1 is initially in the state illustrated in FIG. 1. Valve 6 is biased closed by coil spring 46, and valve 4 is biased open by spring 25. The plug is placed within a section of pipeline 15 which is to be tested for leaks. Referring now to FIG. 4, pipline valve 48 is maintained open while fluid is pumped in behind plug 1 through pipeline valve 47. Since central valve 4 is open, fluid pressure is communicated through bore 11, bore 13, valve 4, and against sealing cups 16 to establish a pressure differential across sealing cups 16 which drives the device down the pipeline to the desired location. Valve 6 is biased closed and maintains the pressure differential across the seal cups 16. When the locator plug is in the desired position which can be determined by several different methods, for instance by monitoring the amount of fluid pumped behind the plug and/or by having a radio transmitter located within the plug to signal its location, the pipeline valve 47 is closed and the empty portion of the pipeline is filled with fluid from pipeline valve 48 to the locator plug 1. This fluid is filled through pipeline valve 48 is maintained open after valve 47 is closed. After the entire pipeline is filled with fluid, valve 48 is closed and both sections of the line are pressured to a hydrostatic pressure sufficient to push mandrels 27 and 37 to the left against coil springs 25 and 46 in gas chambers 24 and 49 which are initially substantially near atmospheric pressure. the hydrostatic pressure working through open valve 4 and through bore passages 45, 17, and 41 creates a pressure differential across mandrels 27 and 37. This pressure differential is counteracted by coil spring 25 and 46. Coil spring 46 is slightly weaker than coil spring 25 to allow valve 6 to operate prior to valve 4. Upon reaching a predetermined hydrostatic pressure, which can be adjusted beforehand by replacing springs 25 and 46 with springs of greater or lesser tension, mandrel 37 compresses spring 46 enough to align ports 36 with recess 38 which opens valve 6 and removes any posibility of a pressure differential from arising across sealing cups 16. Since the whole pipeline is being pressured equally, no differential exists across cups 16 immediately prior to the closing of valve 4 and therefore the plug has become stationary in the pipeline due to its lack of motive force.

After hydrostatic pressure reaches the predetermined limit which opens valve 6, no more pressure is applied to the left end 50 of the pipeline but the right end 51 continues to receive pressure through valve 47. Shortly thereafter as pressurization of the right end continues, spring tension in coil spring 25 is overcome by the pressure differential across mandrel 27 to chamber 24, and mandrel 27 to chamber 24, and mandrel 27 moves to the left closing valve 4 by moving ports 34 past recess 35 and past one of the seals 32. As pressurization of the right end continues, the closing of valve 4 immediately creates a pressure differential across head 8, casing 9 and cup 12, forcing ribs 10 into contact with the pipeline 15 and firmly anchoring the seal plug in the pipeline establishing a stationary fluidically sealed barrier in the pipeline.

Fluid pressure can then be measured at valve 47 or at valve 48 or at both valves 47 and 48 to determine if a leak is located in either portion of the section of pipeline being tested. After the leaking half of the pipeline is located, the plug 1 can be moved into this half to further narrow down the exact location of the leak. This process of halving the line and then halving each half can be repeated until the exact location of the leak is determined.

As an alternative the plug 1 can be moved down the line at substantially equal measured increments rather than using the halving process. This reduces the amount of reverse flowing of the plug in the pipeline which amount could be very substantial in the halving process and which flowing tends to be detrimental to cup 12. Measurement of pressure could, as before, be at valve 47 or valve 48 or at both valve 47 and valve 48.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. For example the coil spring biasing means in the central valve 4 and front valve 6 could be augmented or replaced by a gas chamber containing a gas under pressure such as nitrogen, which when compressed would aslo be act as a biasing means. It would aslo be possible to use in place of seal means 7 any type of device which expands in response to differential pressure to contact the pipeline interior surface or any device which extends gripping means such as serrated clips or abutments into gripping arrangement with the pipeline. It is also obvious to use several types of flexible joints such as links, or braided steel cable in place of universal joint 3, or to use any type of flexible or semi-flexible sealing cups in place of those shown at 16.

It is also possible to use more than one section of sealing cups with each section joined by flexible couplings. For relatively straight pipeline section, it would be possible to leave flexible couplings out of the device and rigidly attach seal member 2, extension 44 and central valve 4 together, to form a non-flexible shorter expandable pipeline plug. This invention could also utilize any form of hydrostatically operated biased valves to replace valves 4 and 6. Thus, this invention is declared to cover all changes and modifications of the specific example of the invention herein disclosed for purposes of illustration, which do not constitute departures from the spirit and scope of the invention.

Thus, having described my invention, what I claim is:
1. A method of locating a leak in a pipeline, comprising:
   a. placing an unexpanded separation plug in a section of pipeline to be tested;
   b. pumping fluid into one end of said section so as to pressurize a first portion of said section;
   c. moving said unexpanded plug toward the other end of said section in response to the pressure of said fluid pumped into said one end of said section;
   d. stopping said unexpanded plug at a desired location within said section;
   e. filling a second portion of said section between the unexpanded plug and the other end of said section with fluid;
   f. applying at least a predetermined fluid pressure to the entire section of said pipeline;
   g. expanding said separation plug in response to the existence of said predetermined fluid pressure so as to isolate said first portion from said second portion and fix the location of said plug within said section;
   h. measuring one of constant pressure or pressure decrease in each of said first and second portions to determine if either portion contains a leak;
   i. contracting said expanded plug;
   j. moving said contracted plug into one of said portions in response to measurement of pressure decrease therein; and
   k. repreating steps (d) through (j) until the leak location is narrowed down sufficiently for repair.

2. The method of claim 1, wherein said method further comprises:
   repeatedly halving any portion of the section of pipeline found to contain a leak by expanding said plug at approximately the midpoint of that portion of the pipeline determined by the immediately prior pressure monitoring to contain a leak.

3. The method of claim 1 further comprising moving said sepatation plug through said section in substantially equal, measured increments in order to narrow the location of the leak sufficiently to repair the leak.

4. A method of locating a leak in a conduit, which comprises the steps of:
   a. placing an unexpanded movable plug in the conduit so as to divide said conduit into a first portion and a second portion isolated from said first portion;
   b. pressurizing said first portion to a first predetermined pressure;
   c. communicating said first portion with said second portion in response to the existence of said first predetermined pressure;
   d. pressurizing both said first and second portions to a second predetermined pressure, higher than said first predetermined pressure;
   e. reisolating said first portion from said second portion when said second predetermined pressure is reached;
   f. pressurizing said first portion to a third pressure, higher than said second predetermined pressure;
   g. expanding said slug, in response to the existence of said third pressure in said first portion, so as to firmly position said plug in said conduit;

h. measuring one of pressure decrease and constant pressure in one of said pressurized first and second portions;

i. contracting said expanded plug so as to return one plug to said unexpanded condition;

j. moving said plug an incremental distance into the other of said first and second portions of said conduit only in response to measurement of constant pressure in said one portion thereby decreasing the length of the other of said first and second portions by said incremental distance, and increasing the length of said one portion by said incremental distance;

k. repeating steps (b) through (j) until the first of measurement of pressure decrease and reduction of said second portion to a predetermined length occurs, thereby locating a leak as being within said incremental distance by which said plug was moved immediately preceding any said measurement of pressure decrease.

5. A method of locating a leak in a conduit, which comprises the steps of:

a. placing an unexpanded movable plug in the conduit so as to divide said conduit into first portion and a second portion;

b. expanding said plug so as to isolate said first portion from said second plug;

c. pressurizing both said first portion and said second portion;

d. measuring one of pressure decrease and constant pressure in each of said portions;

e. contracting said expanded plug so as to return said plug to said unexpanded condition;

f. moving said unexpanded plug an incremental distance into one of said portions only in response to said measurement of pressure decrease in said one of said portions, thereby increasing the length of the other of said portions by said incremental distance and decreasing the length of said one of said portions by said incremental distance; and g. repeating step (b) through (f) until the first of measurement of constant pressure in said one of said portions and reduction of said one of said portions to a predetermined length occurs, thereby locating a leak as being within the incremental distance by which said plug was moved immediately preceding any said measurement of constant pressure in said one of said portions.

6. The method of locating a leak in a conduit as recited in claim 5 further comprising the steps, subsequent to step (g), of:

h. moving said unexpanded plug into said one of said portions a segmental distance less than the last said incremental distance by which said plug was moved immediately preceding any said measurement of constant pressure, thereby decreasing the length of said one of said portions by said segmental distance and increasing the length of said other of said portions by said segmental distance; and i. repeating steps (b) through (h) until pressure decrease is measured.

7. The method of locating a leak in a conduit as recited in claim 5, wherein:

said step (a) further comprises the step of placing said unexpanded plug approximately halfway down said conduit;

said incremental distance equals one-half of said one of said portions; and said segmental distance equals one-half the incremental distance by which said plug was moved immediately preceding said measurement of constant pressure.

8. The method of locating a leak in a conduit, as recited in claim 5, wherein:

each of said incremental distances by which said unexpanded plug is moved is substantially equal, and said incremental distance is at least as short as the maximum length of conduit in which it is desired to locate the leak, so as to allow movement of said plug in one direction only.

9. A method of locating a leak in a conduit, which comprises the steps of:

a. placing an unexpanded movable plug in the conduit so as to divide said conduit into first portion and a second portion;

b. pressurizing both said first portion and said second portion;

c. expanding said plug so as to isolate said first portion from said second portion;

d. measuring one of pressure decrease and constant pressure in each of said portions;

e. contracting said expanded plug so as to return said plug to said unexpanded condition;

f. moving said unexpanded plug an incremental distance into one of said portions only in response to said measurement of pressure decrease in said one of said portions, thereby increasing the length of the other of said portions by said incremental distance and decreasing the length of said one of said portions by said incremental distance; and g. repeating steps (c) through (f) until the first of measurement of constant pressure in said one of said portions and reduction of said one of said portions to a predetermined length occurs, thereby locating a leak as being within the incremental distance by which said plug was moved immediately preceding any said measurement of constant pressure in said one of said portions.

10. The method of locating a leak in a conduit as recited in claim 9 further comprising the steps, subsequent to step (g), of:

h. moving said unexpanded plug into said one of said portions a segmental distance less than the last said incremental distance by which said plug was moved immediately preceding any said measurement of constant pressure, thereby decreasing the length of said one of said portions by said segmental distance and increasing the length of said other of said portions by said segmental distance; and i. repeating steps (c) through (h) until pressure decrease is measured.

11. The method of locating a leak in a conduit as recited in claim 9, wherein:

said step (a) further comprises the step of placing said unexpanded plug approximately halfway down said conduit;

said incremental distance equals one-half of said portions; and said segmental distance equals one-half the incremental distance by which said plug was moved immediately preceding said measurement of constant pressure.

12. The method of locating a leak in a conduit, as recited in claim 9, wherein:

each of said incremental distances by which said unexpanded plug is moved is substantially equal, and said incremental distance is at least as short as the maximum length of conduit in which it is desired to locate the leak, so as to allow movement of said plug in one direction only.

13. The method of claim 9 further comprising the steps, subsequent to step (a) and prior to step (b), of:
j. introducing a quantity of fluid into said first portion;
k. moving said unexpanded plug a distance into said second portion in response to said fluid introduction; and
l. introducing a quantity of fluid into said second portion.

14. A method of conduit leak location, which comprises the steps of:
a. placing an unexpanded movable plug in a conduit to separate said conduit into a first portion and a second portion isolated from said first portion with said plug therebetween;
b. introducing a first quantity of fluid into said first portion;
c. moving said plug a predetermined distance into said second portion in response to said introduction of said first quantity of fluid;
d. introducing a second quantity of fluid into said second portion;
e. pressurizing said first portion to a first predetermined pressure;
f. communicating said first and second portions in response to the existence of said first predetermined pressure;
g. pressurizing said second portions simultaneously to a second predetermined pressure higher than said first predetermined pressure;
h. reisolating said first portion from said second portion in response to the existence of said second predetermined pressure;
i. pressurizing said first portion to a third pressure higher than said second predetermined pressure;
j. expanding said plug in response to the difference between said third and second pressures, so as to firmly position said plug within said conduit;
k. measuring one of pressure decrease and constant pressure in at least one of said portions;
l. contracting said expanded plug so as to return said plug to said unexpanded condition; and
m. repeating steps b, c, e, f, g, h, i, j, k and l as necessary to further narrow down the location of any leak in said conduit.

15. A method of conduit leak location, which comprises the steps of:
a. placing an unexpanded movable plug in a conduit to separate said conduit into a first portion and a second portion isolated from said first portion with said plug therebetween;
b. introducing a first quantity of fluid into said first portion;
c. moving said plug a predetermined distance into said second portion in response to said introduction of said first quantity of fluid;
d. introducing a second quantity of fluid into said second portion;
e. moving said plug a distance into said first portion in response to said introduction of said second quantity of fluid;
f. pressurizing said first portion to a first predetermined pressure;
g. communicating said first and second portions in response to the existence of said first predetermined pressure;
h. pressurizing said first and second portions simultaneously to a second predetermined pressure higher than said first predetermined pressure;
i. reisolating said first portion from said second portion in response to the existence of said second predetermined pressure;
j. pressurizing said first portion to a third pressure higher than said second predetermined pressure;
k. expanding said plug in response to the difference between said third and second pressures so as to firmly position said plug in said conduit; and
l. measuring one of pressure decrease and constant pressure in at least one of said portions.

16. A method of conduit leak detection, which comprises the steps of
a. placing an unexpanded movable plug in a conduit so as to separate said conduit into a first portion and a second portion isolated from said first portion with a first region of said plug therebetween;
b. introducing a first quantity of fluid into said first portion;
c. moving said plug a predetermined distance into said second portion in response to said introduction of said first quantity of fluid;
d. pressurizing said first portion to a first predetermined pressure;
e. opening a first valve of said plug so as to bypass said first region and communicate said first and second portions of said conduit;
f. pressurizing both said first and second portions to a second predetermined pressure higher than said first predetermined pressure;
g. closing a second valve of said plug, in response to the existence of said second predetermined pressure so as to reisolate said first portion from said second portion;
h. pressurizing said first portion to a third pressure higher than said second predetermined pressure;
i. expanding a second region of said plug against the interior of said conduit so as to anchor said plug in said conduit; and
j. measuring one of pressure decrease and no pressure decrease in at least one of said portions of said conduit, thereby narrowing down the location of any leak in said conduit.

* * * * *